Feb. 26, 1963
H. J. C. GEORGE
3,079,507
OPTICAL PYROMETERS
Filed Jan. 29, 1959
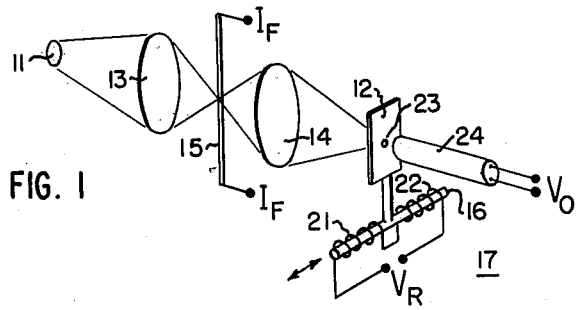
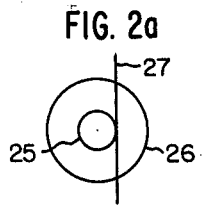
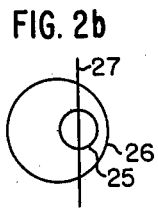
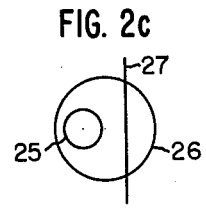
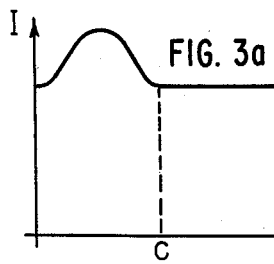
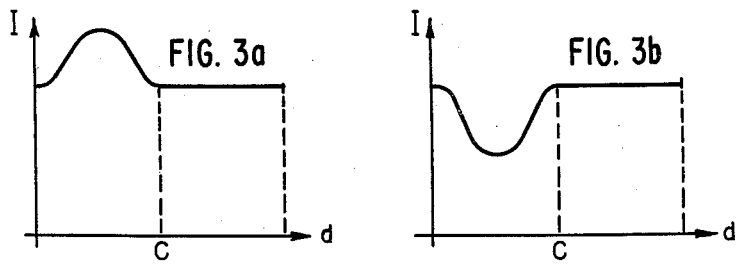
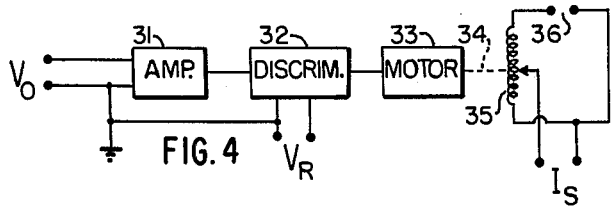
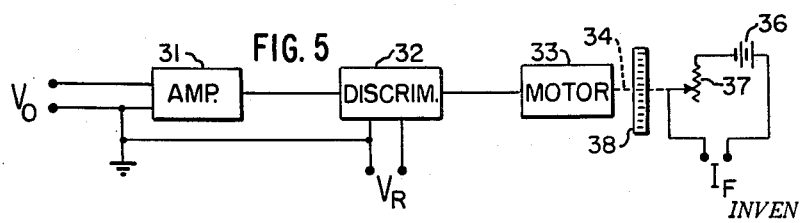
INVENTOR.
HENRI J. C. GEORGE
BY
KENWAY, JENNEY, WITTER & HILDRETH
ATTORNEYS

United States Patent Office 3,079,507
Patented Feb. 26, 1963

---

3,079,507
OPTICAL PYROMETERS
Henri J. C. George, Paris, France, assignor to Quartz & Silice S.A., Paris, France, a corporation of France
Filed Jan. 29, 1959, Ser. No. 789,900
12 Claims. (Cl. 250—217)

The present invention relates in general to new and improved optical pyrometers, in particular, pyrometers of the disappearing filament type.

Heretofore, pyrometers of the disappearing filament type have generally employed two calibrated filament standards whose temperature is slightly different and whose light intensity is compared by separate light-sensitive elements to separate images of the heat source, which it is desired to regulate or whose temperature is to be measured. Inasmuch as such light-sensitive means, particularly photo-sensitive diodes or photo-electric cells, are subject to aging, the risk of introducing an imbalance between the two elements is always present and, unless known and compensated for, such imbalance will impair the efficiency of the regulating mechanism or lead to an erroneous temperature measurement.

Accordingly, it is a primary object of this invention to provide apparatus for overcoming the foregoing disadvantages.

It is another object of this invention to provide an optical pyrometer of the disappearing filament type wherein a single calibrated filament and a single photo-sensitive element are employed.

It is a further object of this invention to provide apparatus for comparing the relative brilliance of two light sources by periodically exposing a light-sensitive element to light emanating from one of said sources only in alternation with light from both said sources superposed.

It is an additional object of this invention to provide apparatus for regulating the temperature of a furnace by controlling its heat source.

It is still another object of this invention to provide apparatus for measuring the temperature of a heat source.

These and other novel features of the invention together with further objects and advantages thereof, will become apparent from the following detailed specification with reference to the accompanying drawings in which:

FIG. 1 illustrates a preferred embodiment for carrying out the invention;

FIGS. 2a, 2b and 2c represent three different instances in the cyclically occurring relative displacement of the observing means and the composite image under observation;

FIGS. 3a and 3b illustrate the different outputs obtainable from the light-sensitive member during the displacement cycle illustrated in FIG. 2;

FIG. 4 illustrates apparatus employing the invention herein to regulate the temperature of a furnace by controlling its heat source, and FIG. 5 illustrates apparatus employing the invention herein for measuring the temperature of a furnace heat source.

With reference now to FIG. 1, the image of a furnace heat source 11 is projected onto a screen 12 by an optical system comprising lenses 13 and 14. A calibrated filament 15 is heated to a standard brilliance with a current $I_f$. The filament is positioned intermediate lenses 13 and 14 such that its image is projected onto screen 12 superposed on the image of source 11 to form a composite image therewith, as explained in greater detail in connection with FIG. 2. Screen 12 is adapted to be vibrated in the directions of the arrows by means of any standard transducer 17. One embodiment of such a vibrator transducer is shown in FIG. 1, wherein screen 12 is rigidly connected to a core 16. The core is adapted to move freely within coils 21 and 22 respectively, in the direction indicated by the arrows. An A.C. reference source $V_r$ is connected to coils 21 and 22 in order to energize the latter. Screen 12 further contains an opening 23 adapted to transmit light from said composite image to a light-sensitive element 24 positioned behind the screen. The latter element may consist of a photo-sensitive diode, a photo-electric cell, or any device adapted to produce an output signal $V_o$ proportional to the intensity of incident light.

In operation, when coils 21 and 22 are excited from source $V_r$, screen 12 is oscillated back and forth at the frequency of the reference source and hence opening 23 is displaced relative to light-sensitive member 24 at the same frequency.

FIGS. 2a, 2b and 2c illustrate the displacement relationship between the screen opening and the composite image. It should be kept in mind that light is received by the light-sensitive element only through the screen opening. Reference numeral 25 denotes the opening in the screen, while 26 represents the image of the heat source. Reference numeral 27 represents the image of the standard filament superposed on the source image and is disposed to one side of the latter.

FIG. 2a illustrates the relationship when the screen is in its central or rest position. It will be noted that opening 25 is tangential to filament image 27. Accordingly, in this position the filament does not contribute to light incident on the light-sensitive element, the latter being governed entirely by the position of the opening relative to the element.

FIG. 2b illustrates the relationship when opening 25 is at one extreme of its oscillation. In this position, the opening is over that portion of the composite image wherein the image of the filament is superposed over the image of the heat source. Depending on whether the brilliance of the filament image exceeds that of the heat source or is less than the latter, the light intensity due to the light incident on the photo-sensitive element is increased or decreased respectively, over the intensity in the rest position.

FIG. 2c illustrates the relationship at the opposite extreme of oscillation of the screen opening. Here, the opening is positioned over the non-superposed portion of the composite image such that the photo-sensitive element is exposed to light from the heat source image only.

As pointed out above, element 24 produces an output current proportional to the intensity of light incident thereon. FIG. 3a illustrates a plot of current I against position $d$ of the oscillating screen opening. Position C, as indicated on the abcissa, is representative of the center or rest position. FIG. 3a illustrates the case wherein the filament appears brighter than the source, due to its higher temperature. In this case, when the opening is in the position indicated by FIG. 2b, the intensity of light incident on element 24 is increased over that generated in the rest position, producing an increased output current. Position C is representative of the position shown in FIG. 2a. It will be noted that the current at this point has decreased from its peak. The right hand portion of the current curve of FIG. 3a is representative of the position shown in FIG. 2c, where the opening is going through the other half cycle of its oscillation. It will be noted that in this position the light-sensitive element sees the heat source image only and hence, its current output will remain at the level attained at position C.

FIG. 3b illustrates a plot of output current of the light-sensitive element 24 against distance of oscillation of screen opening for the case where the standard filament is cooler, and hence less brilliant, than the heat source itself. Here, the position represented in FIG. 2b, where the less brilliant filament is superposed on the heat source image, results in decreased intensity of light incident on the light-sensitive element and therefore in decreased current output of the latter. In the center position C, the light-sensitive element receives light from the heat source image only, and hence, the current increases. The level of increased current is maintained for the relationship corresponding to FIG. 2c where the opening scans the heat source only.

The currents illustrated in FIGS. 3a and 3b respectively, represent D.C. current of varying amplitude. If the D.C. component is eliminated, an A.C. signal is obtained whose phase varies by 180° depending on whether the standard filament is more or less brilliant (and hence, more or less hot respectively) than the heat source.

FIG. 4 illustrates a system wherein the invention is utilized to regulate the temperature of a furnace as determined by a calibrated standard. Output signal $V_o$ which is proportional to the output current received from the light-sensitive element, is amplified in amplifier 31 and subsequently applied to a phase discriminator 32. A reference signal $V_r$ is additionally applied to the discriminator to serve as a phase comparison reference. In a preferred embodiment, the A.C. reference signal applied to vibrator 17 in FIG. 1 is used for this purpose, although it will be understood that a different reference source may be employed. As a result, the phase of the discriminator output signal varies according to whether the standard filament is more or less brilliant than the heat source. The latter signal is applied to a phase-sensitive servomotor 33 whose direction of rotation varies according to the phase of the received signal. A coupling 34 connects the motor output shaft to the tap of a variable transformer 35 to regulate the amount of current $I_s$ supplied to the furnace heat source from a source 36.

As long as the light intensities of the heat source and of the calibrated filament standard are unequal, a signal $V_o$ is received at the input of the amplifier. The latter signal is active to produce a discriminator output signal which actuates the servomotor. The motor coupling drives the transformer tap in a direction to increase or decrease current $I_s$, depending on the phase of signal $V_o$. As a result, the temperature of the heat source changes until its brilliance matches that of the calibrated filament standard, as determined by the light-sensitive element.

As illustrated, the apparatus of FIG. 4 is adapted to operate with a filament whose brilliance remains constant to serve as a standard against which to regulate the temperature of the furnace. For this purpose, after the initial setting has been made, the filament is supplied with a current of constant amplitude. Where it is desired to regulate the temperature of the furnace according to a predetermined program, such process can be carried out efficiently by controlling the filament heating current accordingly. In the latter case, the filament is supplied from a variable current source whose output current is determined by the desired program. As a result, the brilliance of the filament changes according to the desired program, causing the furnace temperature to do likewise.

FIG. 5 illustrates a system wherein the invention is used to measure the temperature of the furnace heat source. Applicable reference numerals have been carried forward from FIG. 4 to the extent that the same units are employed in the present system. As in the case of FIG. 4, signal $V_o$ is amplified and compared against a reference signal $V_r$ in the discriminator whose output signal actuates a phase-sensitive servomotor. Motor shaft coupling 34 is connected to the variable tap of a potentiometer 37 which regulates the amount of heating current $I_f$ drawn from source 36 and applied to the calibrated filament standard. In operation, a signal $V_o$ is received from the light-sensitive element as long as there is a difference in the relative brilliance of the standard filament and of the heat source. When the light intensity of the filament has been adjusted to equal that of the source, mechanical coupling 34 will come to rest in a position which may be read off from scale 38 as an indication of temperature of the furnace heat source.

The apparatus which forms the subject matter of the present invention automatically provides equality of light intensity of the heat source and the calibrated standard filament by the use of a single light-sensitive element. As a consequence, temperature measurements of the heat source as well as temperature regulation of the latter are possible by comparison against the calibrated standard filament.

The invention is not limited to the preferred embodiment illustrated herein. Thus, optical systems different from that employed herein may be utilized to produce a composite image of the heat source and the calibrated standard filament on the screen. Similarly, various schemes are possible for exposing the light-sensitive element to different portions of the composite image. For example, optical means could be employed to oscillate the composite image with respect to the screen opening where the latter is held stationary. Alternatively, the heat source image and the opening could be maintained stationary, motion being confined to the superposed filament image. It is also possible to hold the screen opening and the composite image stationary while oscillating the photo-sensitive element in a manner to expose it to different portions of the composite image.

In the illustrated embodiment of the invention, various transducers can be employed to obtain the oscillatory motion of the screen opening relative to the light-sensitive element. Thus, a vibrator could be employed which is known in France as "bilame ceramique" and which is energized from the A.C. reference source. Furthermore, as pointed out above, various kinds of light-sensitive elements can be used.

Having thus described the invention, it will be apparent that numerous modifications and departures, as explained above, may now be made by those skilled in the art, all of which fall within the scope contemplated by the invention. Consequently, the invention herein disclosed is to be construed as limited only by the spirit and scope of the appended claims.

I claim:

1. Apparatus for comparing the relative light intensities of first and second light sources, said second source being a standard reference source, comprising a light-responsive cell adapted to produce a signal proportional to the intensity of light incident thereon, an A.C. signal reference source, means operative at the frequency of said A.C. signal for alternately admitting light to said cell from said first source only and from said first and second sources superposed, and means for obtaining an output signal from a comparison of the phase of the cell signal with the phase of said reference signal.

2. Apparatus for comparing the light intensity of an unknown source against the intensity of a standard light source, comprising a light-responsive cell adapted to produce a signal proportional to the intensity of light incident thereon, means for obtaining a reference signal at a predetermined frequency, means operative at said predetermined frequency for alternately admitting light to said cell from said source only and from said source and standard superposed, and means for comparing the phase of the resultant cell signal and of said reference signal to derive an output signal having a phase determined by the relative light intensities of said sources.

3. The apparatus of claim 2 and further comprising means responsive to said output signal to regulate the temperature of said unknown source.

4. The apparatus of claim 2 and further comprising means responsive to said output signal to regulate the temperature of said standard, said last-recited means being adapted to cooperate with a calibrated scale to indicate the temperature of said unknown source.

5. Apparatus for comparing the brilliance of a light source with that of a standard, comprising means for projecting an image of said source, means for superposing an image of said standard over a portion of said source image to form a composite image, means responsive to incident light to produce a current, means operative at a predetermined frequency for alternately exposing said light-responsive means to superposed and non-superposed portions respectively of said composite image to produce a current having a phase dependent upon the relative brilliance of said source and standard, and means for comparing the phase of said current against the phase of a reference current to obtain an output signal at said frequency.

6. An optical pyrometer system for controlling the temperature of a furnace containing a heat source, comprising a screen having an opening therein, an optical system for projecting an image of said heat source on the face of said screen, said image being larger than said opening, a filament, means for heating said filament to obtain a standard brilliance, said optical system being further adapted to project an image of said filament on the face of said screen, said opening exceeding the corresponding dimension of said filament image in one direction, the latter image being superposed upon a portion of said heat source image to form a composite image, a vibrator energized from an A.C. reference source for oscillating said screen in said direction, photoelectric means adapted to produce a current proportional to the light incident thereon, said opening admitting light to said photoelectric means from the superposed portion of said composite image at one extreme of screen oscillation and from the non-superposed portion at the other extreme, means for comparing the phase of the photoelectric current against that of said A.C. reference source to obtain an output signal, a motor responsive to the phase of said output signal, a current source adapted to supply said heat source, and means mechanically coupled to said motor for regulating the amount of heating current applied to said heat source.

7. An optical pyrometer system for measuring the temperature of a furnace containing a heat source, comprising a screen having an opening therein, an optical system for projecting an image of said heat source on the face of said screen, said image being larger than said opening, a filament, a current source for heating said filament to obtain a standard brilliance, said optical system being further adapted to project an image of said filament on the face of said screen, said opening exceeding the corresponding dimension of said filament image in one direction, the latter image being superposed upon a portion of said heat source image to form a composite image, a vibrator energized from an A.C. reference source for oscillating said screen in said direction, photoelectric means adapted to produce a current proportional to the light incident thereon, said opening admitting light to said photoelectric means from the superposed portion of said composite image at one extreme of screen oscillation and from the non-superposed portion at the other extreme, means for comparing the phase of the photoelectric current against that of said A.C. reference source to obtain an output signal, a motor responsive to the phase of said output signal, means mechanically coupled to said motor for regulating the amount of heating current applied to said filament, and means for measuring the movement of said coupling means as an indication of furnace temperature.

8. Apparatus responsive to the temperature of a source of heat as indicated by the light intensity of the latter, comprising a screen having an opening therein, first and second optical lenses, a light-emitting filament standard positioned intermediate said lenses, means for heating said filament, said lenses being positioned to project a superposed composite image of said source and said filament on said screen, the image of said source being large compared to said opening, said opening exceeding the corresponding filament dimension in one direction, a photo-sensitive device positioned to receive light through said opening, said device being adapted to produce a current proportional to the light incident thereon, means for oscillating said screen at a predetermined frequency in said direction to expose said photo-sensitive device to different portions of the composite image, said opening being positioned over the superposed images of said filament and source at one extreme of screen oscillation and over the source image only at the other extreme, and a phase discriminator for comparing the phase of said current against a reference to obtain an output signal at said frequency.

9. The apparatus of claim 8 and further comprising a motor energized by said output signal, means mechanically coupling the output shaft of said motor to said filament heating means to regulate the temperature of the latter, the position of said coupling means being adapted to provide an indication of the source temperature.

10. The apparatus of claim 8 and further comprising a motor energized by said output signal, means for regulating the temperature of said source, and means mechanically coupling the output shaft of said motor to said temperature regulating means.

11. The apparatus of claim 10 and further comprising means for regulating said filament heating means to vary the temperature of the latter according to a predetermined program.

12. Apparatus responsive to the temperature of a source of heat as indicated by the light intensity of the latter, comprising a light-emitting filament standard, means for heating said filament, a photo-sensitive device adapted to produce a current proportional to the light incident thereon, means for alternately exposing such device to a composite image of said source and said standard and to said source only to produce a current having a phase dependent upon the relative brilliance of said source and standard, and a phase discriminator for comparing the phase of said current with the phase of a reference current to obtain an output signal.

References Cited in the file of this patent

UNITED STATES PATENTS

| | | |
|---|---|---|
| 1,976,461 | Prince | Oct. 9, 1934 |
| 2,096,323 | Gille | Oct. 19, 1937 |
| 2,219,775 | Harrison | Oct. 29, 1940 |
| 2,494,607 | Bouchet | Jan. 17, 1950 |
| 2,525,147 | Nelson | Oct. 10, 1950 |
| 2,804,131 | Ator | Aug. 27, 1957 |
| 2,843,008 | Moutet | July 15, 1958 |
| 2,867,393 | Burley | Jan. 6, 1959 |

FOREIGN PATENTS

| | | |
|---|---|---|
| 680,853 | Great Britain | Oct. 15, 1952 |